United States Patent [19]

Terranova

[11] 3,708,230
[45] Jan. 2, 1973

[54] APPARATUS FOR LOCATING A VARIABLE OPTICAL FOCAL POINT

[75] Inventor: Warren W. Terranova, Rochester, N.Y.

[73] Assignee: Bausch & Lomb Incorporated, Rochester, N.Y.

[22] Filed: Feb. 18, 1971

[21] Appl. No.: 116,506

[52] U.S. Cl.....................................356/125, 351/6
[51] Int. Cl..........................G01b 9/00, A61b 3/10
[58] Field of Search.......................356/124–127; 351/6

[56] References Cited

UNITED STATES PATENTS 3,136,839   6/1964   Safir.............................351/6

*Primary Examiner*—Ronald L. Wibert
*Assistant Examiner*—Conrad Clark
*Attorney*—Frank C. Parker and Bernard D. Bagdon

[57] ABSTRACT

An apparatus employing a servo system locates the focal point of a scanned beam of light where the scanning beam has a conical locus as in an electronic retinoscope. A pair of photodetectors are spaced apart in the direction of scan and are disposed upon a movable trolley. When the beam is swept across the photodetectors, generally sinusoidal signals are generated which have a phase relationship indicative of the direction of scan of the beam across the photodetectors and, therefore, to the position of the trolley relative to the focal point of the beam. The generated signals are amplified and their peaks or zero crossings are detected to trigger two flip-flop circuit output signals which are phase compared to provide a drive signal to a servo system which through mechanical means drives the trolley toward the focal point. When the trolley is disposed at the focal point, the photodetectors are scanned simultaneously thereby giving no phase difference and, accordingly, no drive signal is generated.

9 Claims, 8 Drawing Figures

WARREN W. TERRANOVA
INVENTOR.

BY
BERNARD D. BOGDON
ATTORNEY

WARREN W. TERRANOVA
INVENTOR.

BY
BERNARD D. BOGDON
ATTORNEY

WARREN W. TERRANOVA
INVENTOR.

BY
BERNARD D. BOGDON
ATTORNEY

APPARATUS FOR LOCATING A VARIABLE OPTICAL FOCAL POINT

BACKGROUND OF THE INVENTION

1. Cross-Reference to Related Application

This application is related to application entitled "Apparatus For Locating A Variable Optical Focal Point" concurrently filed with this application on Feb. 18, 1971 for applicants Clifford A. Leighty, Joseph J. Sliwkowski and Bernard J. Sullivan, Ser. No. 116,505.

2. Field of the Invention

This invention generally relates to optical control apparatus for servo systems and more particularly, to systems which are null-seeking in response to a photostimulus.

3. Brief Description of the Prior Art

The electronic retinoscope, as disclosed in U.S. Pat. No. 3,136,839, issued to Aran Safir, is a major contribution to the field of ophthamology. The previous methods of subjective testing of the eye have been replaced by an objective approach. By subjective, it is meant that the patient personally evaluates his own condition, i.e., by comparing the images of a target while various corrective lenses are placed in front of his eyes. With the electronic retinoscope, the patient does not evaluate the results, but cooperates with the operator by relaxing his accommodation by focusing on a distant scene.

In following the procedures disclosed in the aforementioned patent, separate test readings are taken at various meridians of the eye and the readings are compared to ascertain the overall refractive condition. For commercial reasons, an improvement over an embodiment constructed according to the principles of the Safir invention has since been developed which continuously ascertains and records the refractive condition of the eye at meridians of the eye which are infinitely close together. It is most impractical to adapt the Safir device to process a discrete series of readings generated thereby by feeding that output data to additional electronic equipment for further analysis and finally to a recorder where the information could be displayed. A great deal of additional electronics would be necessary, and practically, such a retinoscope would be far too costly. Each meridian would have to be separately tested and as such the instrument would necessarily be either relatively slow or more complicated. Examination of the patient must be performed quickly, as it has been found that on the average, a person is able to hold his eye suitably still and not blink for about 15 seconds. Therefore, for the test to be meaningful each eye of each patient must be completely tested within a desired time period extending for generally less than 15 seconds.

SUMMARY OF THE INVENTION

It was noted that a faster and less complex system than that disclosed in the Safir patent could be attained if the discrete readings could be eliminated and replaced by a more or less continuous reading technique. Such a reading is available if the reflex rays from the retina of the eye are brought to focus by a lens and any movement of the focal point of the reflex rays is continuously traced as the retinoscope smoothly rotates through the various meridians of the eye.

The invention in one of its broadest aspects comprises a servo system for locating the focal point of a scanning beam of light having a conical locus of scan with the apex thereof at the focal point, there being an inversion of the direction of scan of the beam at the focal point. The servo system is comprised of a photodetector unit which includes at least one and preferably two photosensitive elements having photosensitive surfaces directed toward the beam. The photodetector unit is generally disposed upon the axis of the beam and is movable coaxially therealong providing a phase-sensitive output, the phase thereof being indicative of the direction of scan of the beam across the photosensitive surfaces. The system includes units responsive to the phase-sensitive output for providing a signal indicative of the directional axial position of the photosensitive surface relative to the focal point for receipt by responsive units for moving the photosensitive surfaces toward the focal point whereby when the photosensitive surfaces reach the varying focal point all areas of the photosensitive surfaces are scanned simultaneously.

Further objects, advantages, and features of the invention will be apparent in the arrangement and construction of the constituent parts in detail as set forth in the following specification taken together with the accompanying drawing.

BRIEF DESCRIPTION OF THE DRAWINGS

In the various views and diagrams of the drawing, identical reference numerals refer to identical parts or elements.

DETAILED DESCRIPTION OF THE PREFERRED EMBODIMENTS

Figure 1:
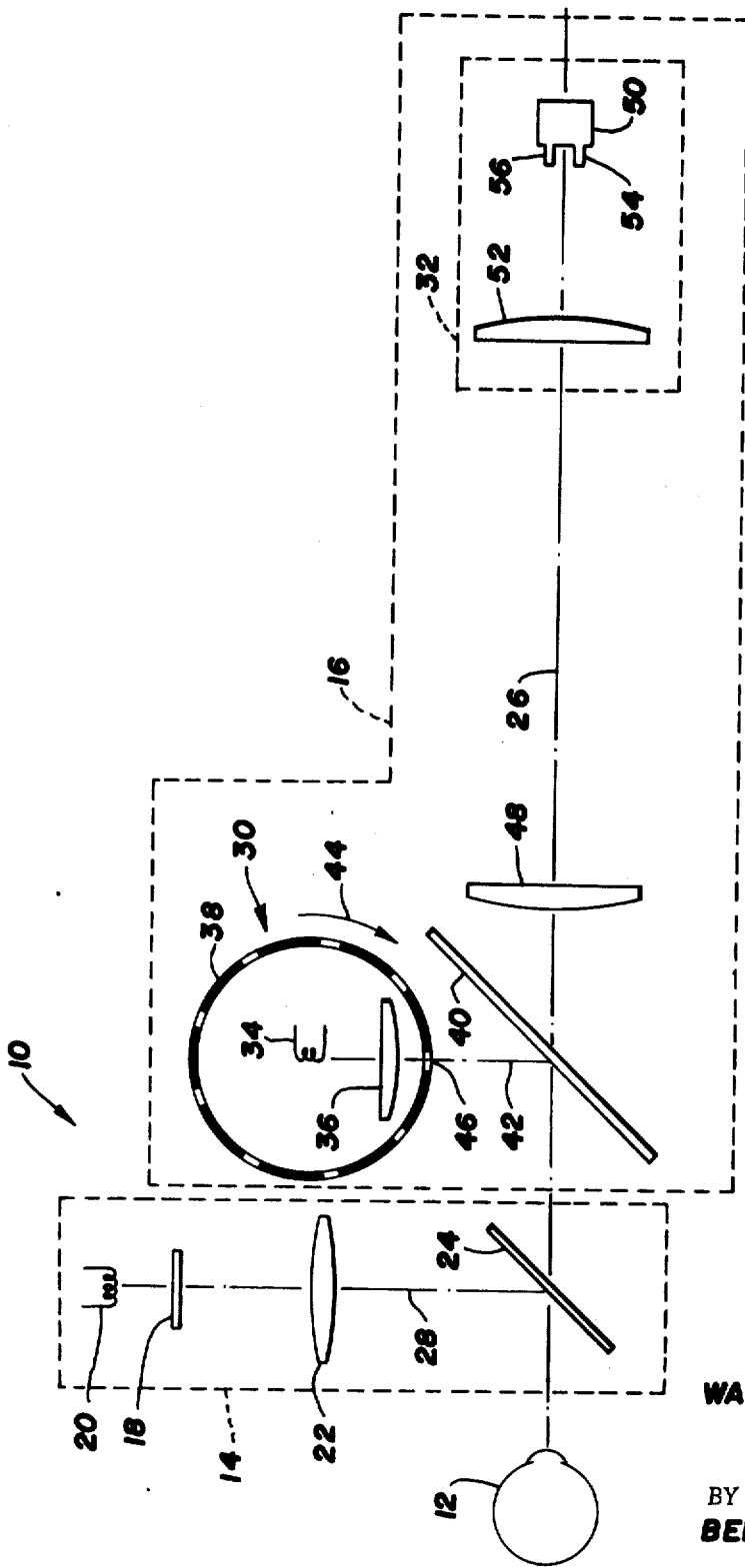
FIG. 1 is a schematic illustration of the optical system of an electronic retinoscope for exemplary application with the disclosed invention.

Referring now to FIG. 1, there is shown a schematic representation of the overall optical system for an electronic retinoscope. The basic principles of operation of the system are similar to those taught in the hereinbefore mentioned U.S. Pat. No. 3,136,839, issued to Aran Safir, and will not be discussed in detail herein. However, a cursory explanation of the overall operation and a more detailed explanation of those areas which are different will be given.

An electronic retinoscope optical assembly 10 is utilized to test the refractive condition of a patient's eye 12. The retinoscope assembly 10 is composed of a fixation optical system 14 and a testing optical system 16, which are separate, but complementary optical systems.

The fixation optical system 14 functions to provide the eye 12 with a point on which to fixate during the test. The fixation point is approximately at the far point of the eye so that the eye 12 is unaccommodated during the test. This is accomplished by providing a target 18 which contains a scene, generally disposed on photographic film illuminated by a fixation lamp 20. The rays transmitted by the target 18 are collimated by a viewing lens 22 and are directed to the eye 12 by reflecting the rays toward the eye 12 with a partially reflecting mirror or beam splitter 24. The beam splitter 24 is generally disposed at a 45° angle to a retinoscope testing system optical axis 26 and to a fixation system optical axis 28.

The testing optical system 16 is generally comprised of a scanning system 30 and a photodetector system 32. The scanning system 30 generates a thin beam of light rays which are periodically scanned across the pupil of the eye 12. The detector system 32 receives the reflex from the retina of the eye 12 and generates a phase-sensitive output indicative of the direction of scan of the beam across the photodetector system 32.

The scanning system 30 is comprised of a light source 34, a condenser lens 36, a chopper drum 38, and a beam divider 40. The lamp 34 and the condenser lens 36 are aligned on an optical axis 42 which transversely intersects the retinoscope testing system optical axis 26 at the surface of the beam divider 40. The condenser lens 36 focuses the rays from the lamp 34 on the retina of the eye 12. The scanning of the beam is accomplished by the chopper drum 38 which is rotatably driven in the direction of an arrow 44, by an electric motor, not shown. The drum 38 has a series of regularly spaced apertures 46 therein which serve to scan the transmitted beam of light periodically across the eye 12.

The reflex action of the eye provides a beam of light having a focal point the locus of which is variable, depending on the refractive condition of the eye 12. To insure that the focal point falls within the physical limits of the retinoscope instrument, an optometer lens 48 is provided to bring the beam of light to a focal point.

The photodetector system 32 is movable in a direction parallel to the optical axis 26 and comprises a detector lens 52 and a photodetector unit 50. The detector lens 52 serves to focus that portion of the beam of light formed by the corneal reflex of the eye 12 onto the photodetector unit 50. The photodetector unit 50 having photosensitive surfaces includes a pair of photosensitive elements 54 and 56 which are arranged adjacent to the optical axis 26 and are arrayed along the direction of scan. The detector lens 52 diverges the retinal reflex rays toward a focal point which, as hereinbefore explained, will generally vary in position along the optical axis 26.

Figure 2:
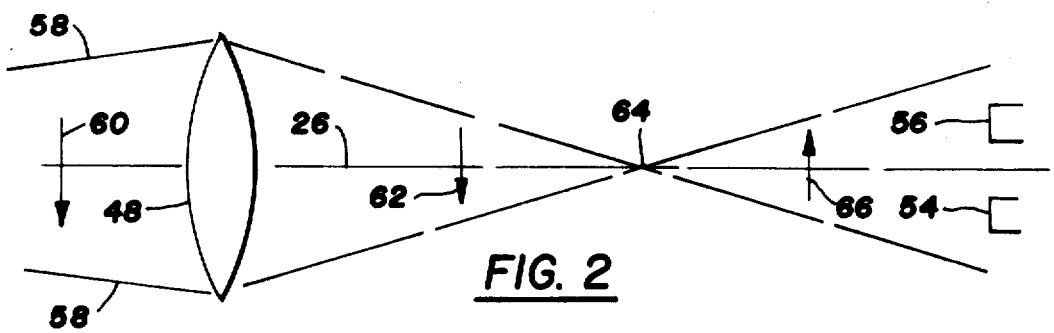
FIG. 2 is a schematic illustration of a focused beam of scanning light showing the physical principle upon which a servo system according to the principles of the present invention operates.

Referring now to FIG. 2, there is shown an enlarged view of the portion of the optical system of FIG. 1 which includes the optometer lens 48 and the photosensitive elements 54 and 56. The locus of the scan of the beam of light is outlined by rays 58. The optometer lens 48 brings the rays to an exemplary focus at a focal point 64. The location of the focal point 64 along the optical axis 26 is determined by the refractive condition of the eye 12 in the particular meridian under test and the detector lens 52, as illustrated in FIG. 1.

An arrow 60, before the optometer lens 48, in FIG. 2, represents a nominal direction of scan of the beam of light. In the converging section of the locus after passing through the optometer lens 48, the direction of scan, represented by an arrow 62, is identical to the direction of scan before the optometer lens 48. However, beyond the focal point 64, in the diverging section of the locus, there is a reversal of the direction of scan as represented by an arrow 66. Therefore, it can be seen that the direction of scan is a means by which the position of the photosensitive elements 54 and 56 may be determined in a qualitative sense. If the surface of photosensitive element 54 is illuminated prior to the surface of the photosensitive element 56, there will be a delay between the respective output signals from the photosensitive elements 54 and 56. Such a delay indicates that the photosensitive surfaces of the photosensitive elements 54 and 56 lie beyond the exemplary focal point 64. In like manner, if the signal order is reversed, the indication is that the photosensitive surfaces of the photosensitive elements 54 and 56 lie before the exemplary focal point 64. If, however, the photosensitive surfaces of the photosensitive elements 54 and 56 lie at the focal point 64, they will either be illuminated simultaneously, or they will not be illuminated depending on the rotational position of the chopper drum 38.

To test other meridians of the eye 12, the entire testing system 16 is rotated relative to the eye 12. A servo system is provided to drive the photosensitive elements 54 and 56, for example, to the focal point 64 and to continuously maintain them at the focal point of the light beam, which is generally varying as the testing optical system 16 tests the various meridians of an ametropic eye.

Figure 3:
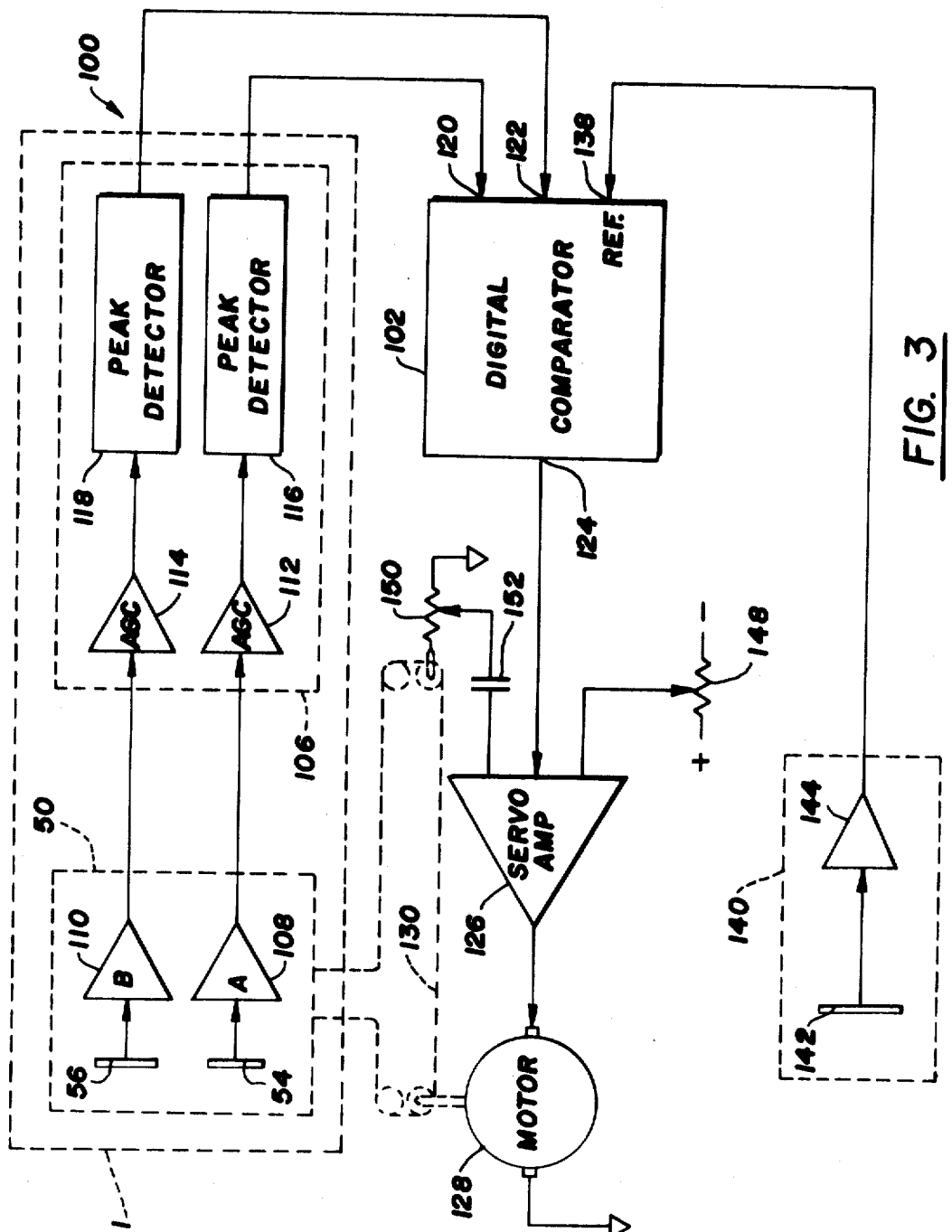
FIG. 3 is a schematic diagram, of a servo system according to the principles of the present invention.

A novel servo system 100, shown schematically in FIG. 3, to provide the drive for moving the photosensitive elements 54 and 56 to the focal point, is formed of three operative sections. A photodetector section 51 generates a phase-sensitive output, the phase thereof being a function of the individual responses of the photosensitive surfaces 54 and 56, correspondingly, an indication of the location of the photosensitive surfaces relative to the focal point of the focused beam. A comparator section 102 is provided to generate a signal which is representative of the directional axial position of the photosensitive surfaces relative to the focal point of the beam in response to the phase-sensitive output from the photodetector section 51. Finally, a translator section is provided for moving the photosensitive elements 54 and 56 along the optical axis toward the focal point.

The photodetector section 51 generally comprises two functional elements, the photodetector unit 50 and a peak detector unit 106 or the like. In both units 50 and 106, identical parallel signal paths are included for each information channel. In the photodetector unit 50, which includes the photosensitive elements 54 and 56, there is included a pair of fixed gain amplifiers 108 and 110. For convenience, the channel which originates at the element 54 will be referred to as channel A, and the channel originating at 56 as channel B. The amplifiers 108 and 110 are in channels A and B, respectively, and are connected to the outputs of the respective photosensitive surfaces. However, the amplifiers may be excluded from the circuits depending on the particular applications and the signal levels required. The output signals from the photodetector unit 50 are a pair of phase related generally sinusoidal signals dependent on the sequence of scan of the beam of light across the photosensitive surfaces 54 and 56.

In the peak detector unit 106 there is included a pair of automatic gain control amplifiers 112 and 114 and a pair of peak detector circuits 116 and 118 in channels A and B, respectively. The amplifiers 112 and 114 provide constant level signals to the peak detectors 116 and 118. Whether it is necessary to include the amplifiers 112 and 114 depends upon the signal levels present and the particular peak detector circuit chosen. The output signals from the peak detector unit 106 comprises a pair of phase related pulses suitable for triggering digital circuitry. The system may include zero-crossing units in lieu of the peak detector units. A system operating with zero-crossing units is described hereinafter.

The comparator section 102 is digital and receives the phase related pulses from the peak detectors 116 and 118 at terminals 120 and 122 and compares the two pulse signals to determine the phase relationship therebetween. From this relationship, the digital comparator 102 generates an output signal at terminal 124 whose magnitude and polarity is a function of the distance between the position of the photosensitive elements 54 and 56 and the focal point of the beam.

The output signal from the digital comparator 102 at terminal 124 is fed to a servo amplifier 126 of the translator section for moving the photodetector elements 54 and 56. The translator section of the preferred embodiment comprises the servo amplifier 126, a servo motor 128, and a drive system 130 for movably connecting the servo motor 128 to the photodetector unit 50. The drive system 130 is a continuous cord trolley mechanism which draws the photodetector unit 50 along a set of rails parallel to the optical axis in response to the commands of the servo system.

A generator unit 140 is provided to generate a reference reset signal for applying to the digital comparator 102 at terminal 138 to distinguish which of the signals fed into the digital comparator at terminals 120 and 122, respectively, is leading the other. The reference reset signal can be derived by any well-known means in the art; however, in the preferred embodiment, a photodetector element 142 is connected through a saturating amplifier 144 and connected to the digital comparator 102 at terminal 138. The photodetector element 142 is disposed to receive light pulses directly from the chopper drum 38 without traversing the path through the eye 12. This signal resets the digital comparator 102 at the start of each scan so that no ambiguity between leading and trailing signals can occur.

The response of the servo amplifier 126 is calibrated by means of a potentiometer 148 in order for the servo system to accurately position the photodetector unit 50 at the focal point.

The servo amplifier 126 is coupled through a capacitor 152 to a potentiometer 150 which is mechanically coupled to a pulley over which the continuous chord of the drive system 130 extends. This tachometer control provides a negative feedback loop to control the slew rate of the photodetector unit 50 along the optical axis.

Figure 4:
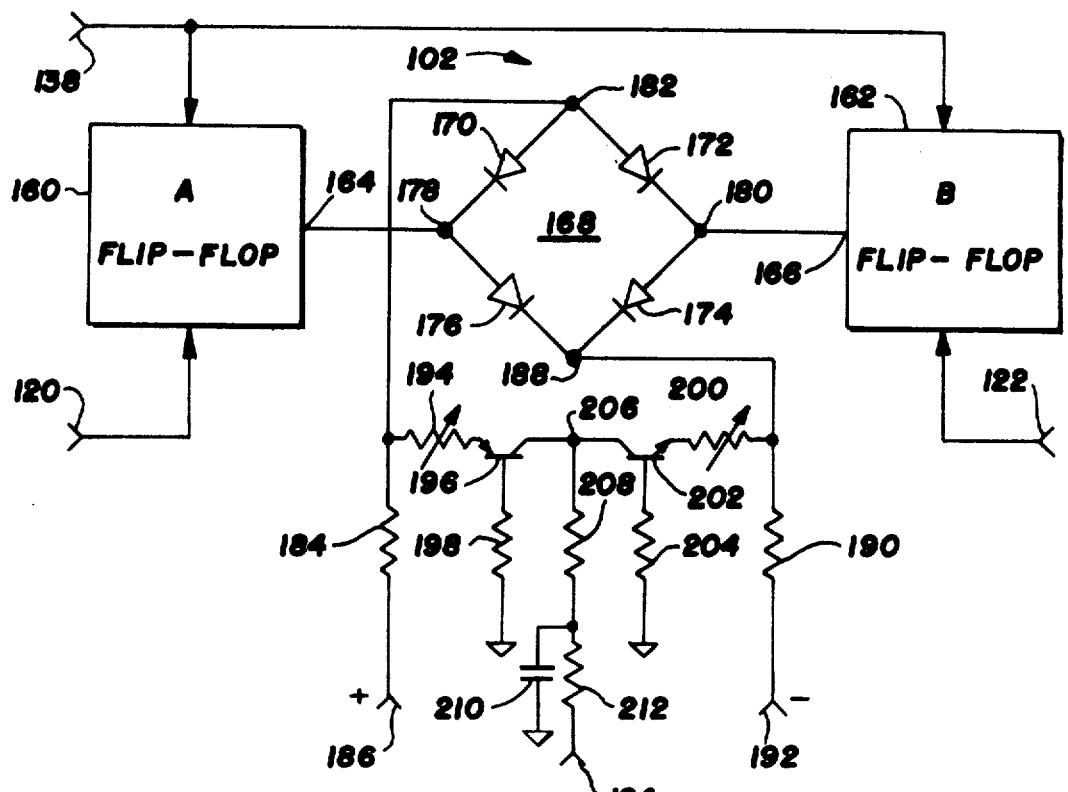
FIG. 4 is a schematic diagram of the digital comparator of FIG. 3.

FIG. 4 is a schematic diagram of the digital comparator 102 in FIG. 3, and is partially shown in block diagram form. A pair of bistable switching circuits 160 and 162, such as flip-flop circuits are, respectively, associated with channels A and B. The input signal from the channel A peak detector 116 is present at the terminal 120 of the flip-flop 160 and the input signal from the B channel peak detector 118 is present at the terminal 122 of the flip-flop 162. Also coupled to each of the flip-flops 160 and 162 is the reference or reset signal at the common terminal 138.

Connected between output terminals 164 and 166 of the flip-flops 160 and 162, respectively, is a diode bridge circuit 168 containing diodes 170, 172, 174 and 176. The output terminal 164 is coupled to the junction 178 between the anode of the diode 176 and the cathode of the diode 170. The output terminal 166 is similarly coupled to the junction 180 between the cathode of the diode 172 and the anode of the diode 174.

A junction 182 between the anodes of the diodes 170 and 172 is coupled through a resistor 184 to an input terminal 186 to which a suitable source of positive potential (V+) is coupled. In like manner, a junction 188 between the cathodes of the diodes 174 and 176 is coupled through a resistor 190 to an input terminal 192 to which a source of suitable negative potential (V−) is coupled.

The junction 182 is also coupled through a variable resistor 194 to the emitter of a PNP transistor 196, the base of which is coupled to a source of ground potential through a resistor 198. Similarly, the junction 188 is coupled through a variable resistor 200 to the emitter of an NPN transistor 202, the base of which is also coupled to the source of ground potential through a resistor 204.

The collectors of the transistors 196 and 202 are joined at a junction 206 which is coupled through a filter to the output terminal 124. The filter is composed of a capacitor 210 and serially connected resistors 208 and 212. The filter serves to smooth the output signal at the terminal 124.

In operation, the flip-flop 160 whose output has two states, positive at level V+ or negative at level V− provides an output signal which is either A or Ā, i.e., ("-not" A) with the negative state considered for this purpose to be a "0" and the positive state to be a "1." Therefore, A is a "0" and is termed the "RESET" state and Ā is a "1" or the "ON" state. The flip-flop 162, likewise, has two output states, B which is a "0" or "ON" state and B̄ which is a "1" or "RESET" state.

In the "RESET" state for the channel A circuit, the output 164 of the flip-flop 160, is A which is a "0," the diode 170 is forward biased and, therefore, the junction 182 is negative and the transistor 196 is turned off. Also the output 166 of the flip-flop 162 is B which is a "1," thereby forward biasing the diode 174 and rendering the junction 188 positive turning off the transistor 202. With both of the transistors 196 and 202 turned off, the junction 206 is at ground potential and no signal is present at the terminal 124.

Figure 5:
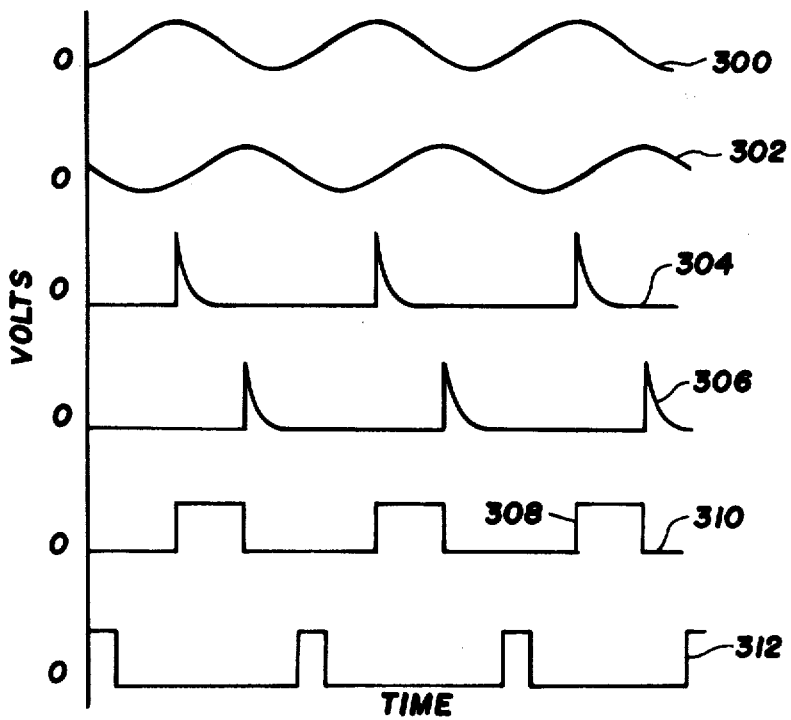
FIG. 5 is a graphical waveform illustration of the operation of the invention in a linear direction.

Initially, for example, the case where the signal in the channel A leads the signal in the channel B will be examined, reference being made to the various waveforms shown in FIG. 5. Waveforms 300 and 302 represent the output signals from the photosensitive elements 54 and 56 which are the inputs to the peak detectors 116 and 118 for the channels A and B, respectively. The peak detectors 116 and 118 generate waveforms 304 and 306 where the pulses correspond to the location of the positive peaks in the waveforms 300 and 302, respectively.

The pulse in the channel A input signal to the digital comparator 102 causes the output 164 of the flip-flop 160 to go to the "1" state. At this time, the diode 176 becomes forward biased and the diode 170 becomes reverse biased. The junction 182 now is positive and the transistor 196 is turned on which creates a positive voltage at junction 206 and, therefore a positive output signal at the terminal 124. The amplitude of the signal is adjusted by the potentiometer 194. This is shown by a leading edge 308 in the waveform 310.

The output signal at the terminal 124 remains positive until the B channel peak arrives at the digital comparator 102. This spike causes the output 166 of the flip-flop 162 to go to a "0" or negative state at the terminal 166, the A channel output remains a "1." The diode 176 remains forward biased and the junction 188 remains positive. The diode 172 becomes forward biased which pulls the junction 182 negative, thereby turning off the transistor 196 and causing the output signal at the terminal 124 to drop back to zero as shown in the waveform 310.

After providing an output pulse at the terminal 124, a new scan starts, and the generated reset signal, shown as waveform 312, switches the flip-flop 160 and 162 back to the "RESET" state.

Figure 6:
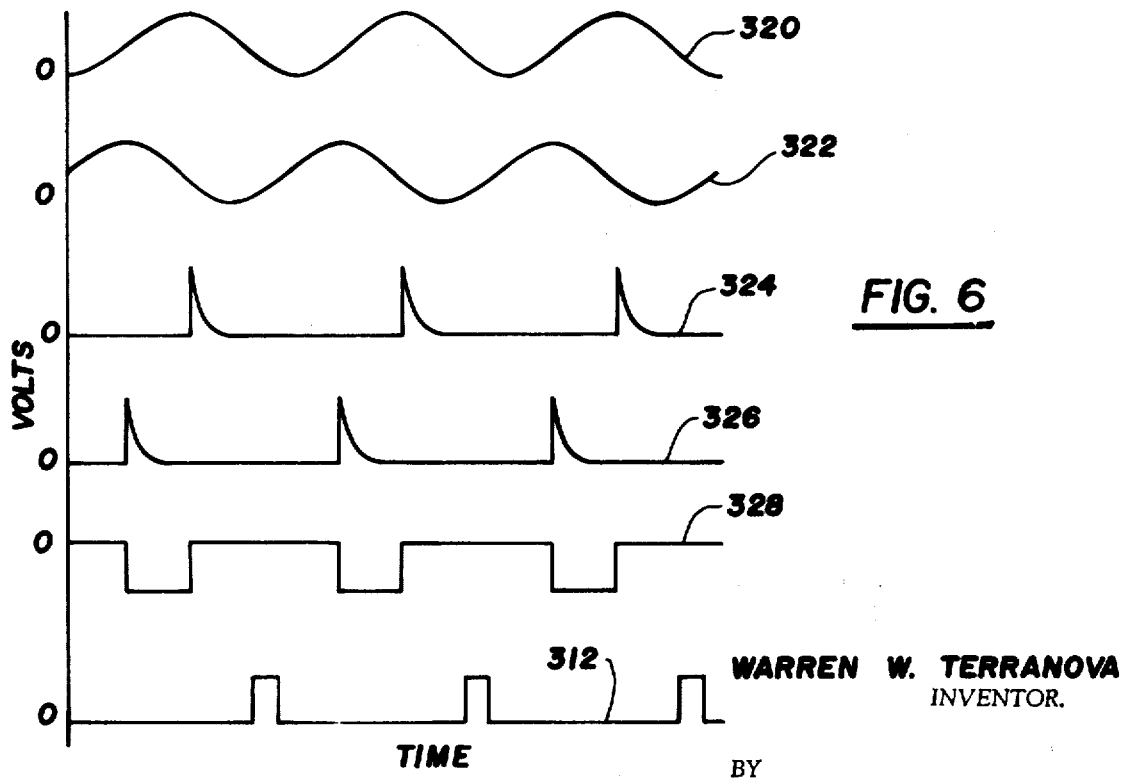
FIG. 6 is a graphical waveform illustration of the operation of the invention in a linear direction opposite to that of FIG. 5.

Similarly, if the channel B peak arrives prior to the channel A peak, as shown by waveform 320, 322, 324 and 326 in FIG. 6, the output of the flip-flop 162 goes negative, B̄ is a "0," which reverse biases the diode 174 and forward biases the diode 172, thereby turning on the transistor 202 which pulls the junction 206 negative and produces a negative signal at the terminal 124, as shown by a waveform 328.

When the channel A peak arrives, the flip-flop 160 switches to a "1," which forward biases the diode 176 thereby pulling the junction 188 positive and turning off the transistor 202. The voltage at the junction 206 and the output signal at the terminal 124 drop to zero and remain there upon application of the reset waveform 312.

It can be seen from the foregoing that either a positive or negative signal is applied to the servo motor 128 to drive the photosensitive elements 54 and 56 toward the focal point. While the amplitude of the signal applied to the servo motor 128 is constant, the duty cycle varies according to the phase relationship of the A and B channels. Accordingly, the average voltage is a function of the displacement of the photosensitive elements 54 and 56 from the focal point.

Figure 7:
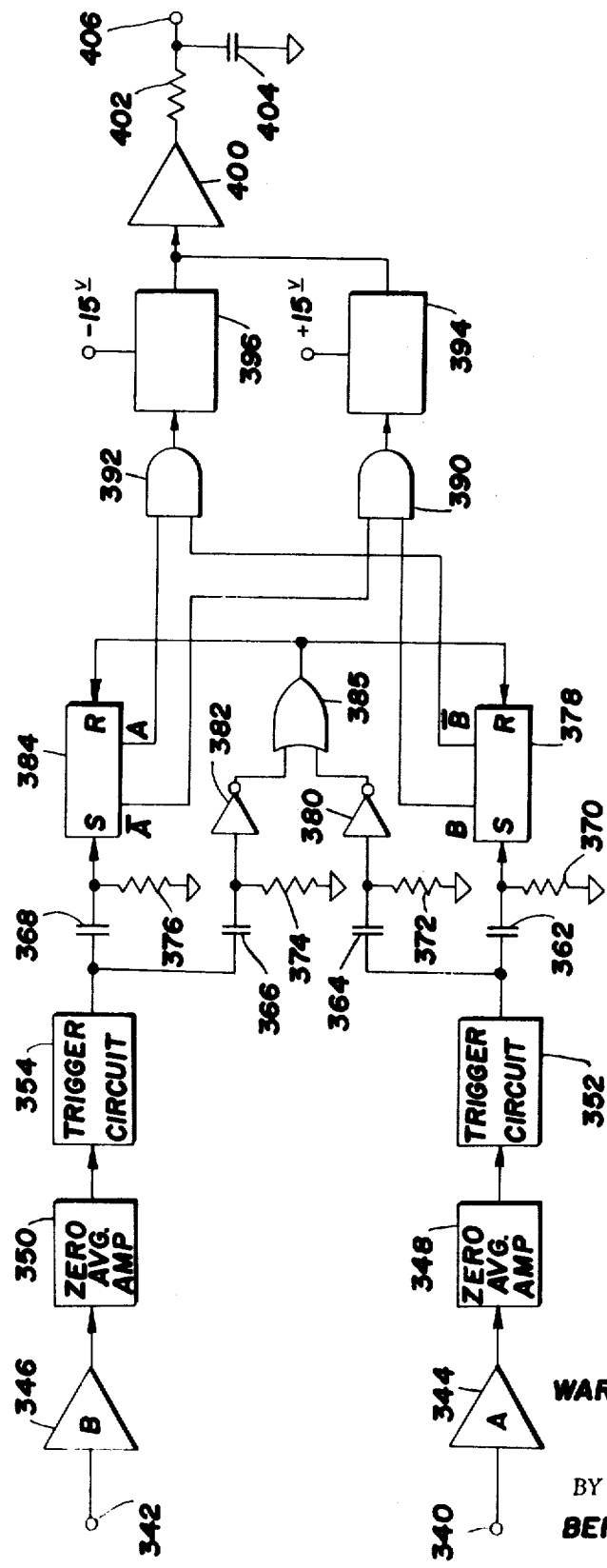

As hereinbefore mentioned, the system can be easily modified to include zero-crossing units as illustrated, for example, in FIG. 7 to replace peak detector units as illustrated in FIG. 3. Obvious comparisons exist between FIGS. 3 and 7. As hereinbefore described, in reference to FIG. 3, the photodetector section 51 includes two generally identical parallel paths for processing the sinusoidal signals generated by the photodetector unit 50. The illustration of FIG. 7 likewise includes two substantially identical parallel electrical paths. For convenience of description in FIG. 7, the electrical path originating at a terminal 340 for receiving the signal from the photosensitive element 54 will be identified as channel A. Similarly, a terminal 342 for receiving sinusoidal signals from the photosensitive element 56 will identify the start of the path hereinafter referred to as channel B. The channel A sinusoidal signal generated by the photosensitive element 54 and received by the terminal 340 is transmitted into an adjustable gain amplifier 344 for amplifying the signal to a nominal 10 volts measured peak to peak amplitude, to pass therefrom into a zero averaging amplifier 348 having a gain of one, for generally eliminating undesirable direct current and voltage offsets associated with high gain amplifiers and to center the wave about 0 volts and form a sinusoidal waveform 351, illustrated in FIG. 8.

Figure 8:
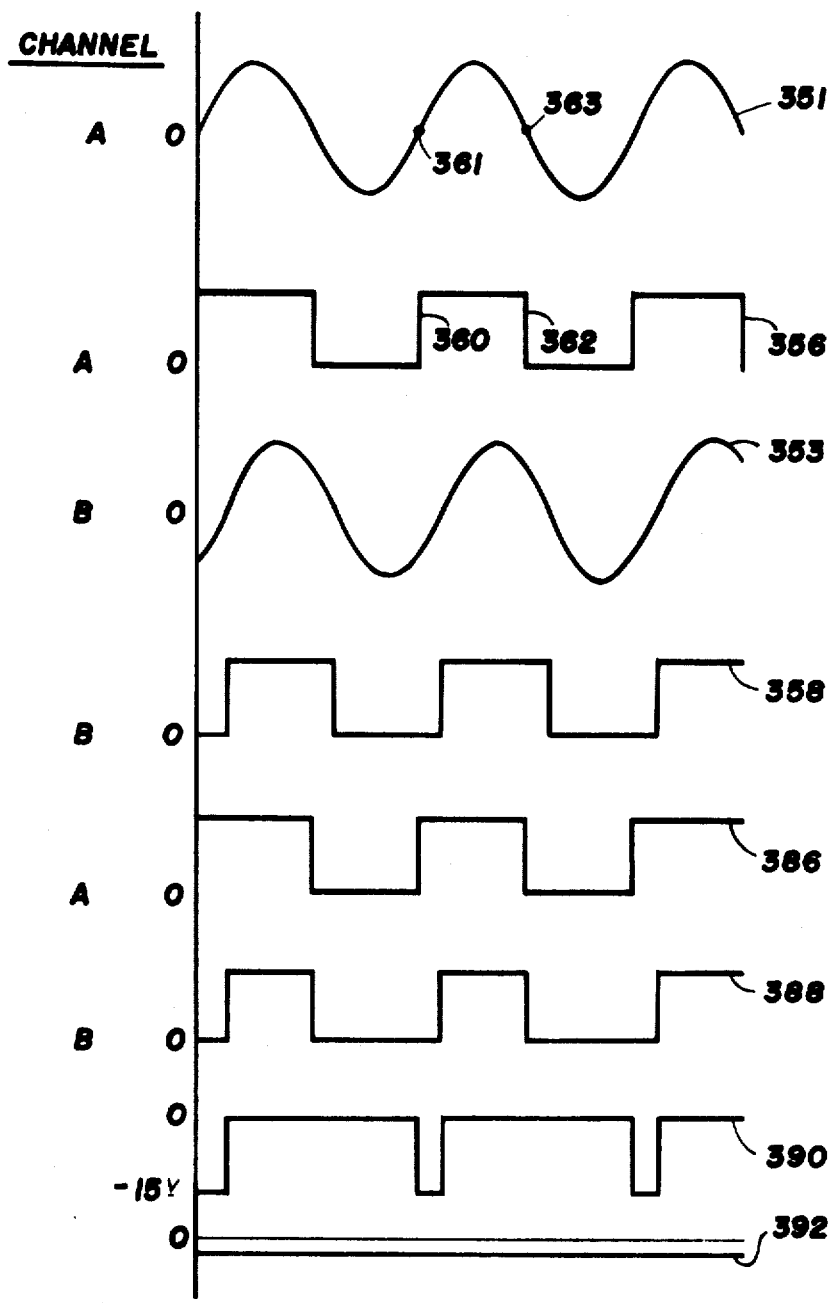

A trigger circuit 352 receives the signal in channel A from the zero averaging amplifier 348 to produce a square wave 356, as best seen in FIG. 8. It will be noted, for example, that typically a positive-going portion 360 of the square wave 356 occurs at the zero-crossing point 361 of the positive-going portion of the sinusoidal wave 351, and similarly, for example, a negative-going portion 362 of the square wave 356 occurs when the sinusoidal waveform 351 crosses zero at a point 363 when passing to the negative region.

The square wave 356 is then simultaneously applied to two similarly constructed RC coupled differentiator circuits, each, respectively, including capacitors 362 and 364 serially connected thereto, and parallelly disposed resistors 370 and 372 each connected to ground potential. The differentiator circuits spike, as a function of the square wave 356, and apply the respective signals to a channel A flip-flop 378 and a channel A inverter 380. The spiked signal to the flip-flop 378 sets the flip-flop as indicated by the S at the connection from the differentiator circuit, when a positive-going portion 360 of the square wave 356 occurs. The inverter 380 inverts a negative-going portion 362 of the channel A waveform 356 and transmits the inverted signal to an OR gate 385 for generating a signal for, respectively, resetting the flip-flop 378 in channel A and a flip-flop 384 in channel B. The reset signal being received by the flip-flops 378 and 384 at an input terminal R designating reset, respectively.

As hereinbefore mentioned and as obvious from FIG. 7, transmission through channel B, of the initial sinusoidal signal received at a terminal 342 from the photosensitive element 56 is similar to the hereinbefore described sinusoidal transmission through channel A, passing to an adjustable gain amplifier 346 to thereafter be zero averaged by an amplifier 350 and appear as waveform 353 illustrated in FIG. 8. A square wave signal 358 is generated as a function of the corresponding zero crossings of the channel B sinusoidal signal 353 and is thereafter differentiated by, respective, RC coupling circuits including serially connected capacitors 366 and 368 and parallelly joined grounded resistors 374 and 376 to be respectively received by an inverter 380 and the channel B flip-flop 384 at its S terminal.

As hereinbefore mentioned, the OR gate 385 in the reset circuit generates a signal for resetting both the channel A and channel B flip-flops 378 and 384, respectively, by the negative-going portions of either of the square wave signals 356 or 358. As will be appreciated, the signal outputs of the channel A and channel B flip-flops 378 and 384 are A, $\bar{A}$ or B, $\bar{B}$, respectively, as indicated in FIG. 7 and illustrated by the waveforms 386 and 388 in FIG. 8 for channels A and B, respectively. The output terminals of the flip-flops 378 and 384 are cross connected to AND gates 390 and 392 to enable the AND gate 390 when a condition of $\bar{A} \cdot B$ is present and to enable the AND gate 392 when a condition of $A \cdot \bar{B}$ is present.

If the condition $A \cdot \bar{B}$ is met, an analog gate 396 connected to the AND gate 392 operates to generate a $-15$ volt pulse, the pulse width corresponding to the duration of the $A \cdot \bar{B}$ condition. Similarly, if the condition $\bar{A} \cdot B$ is met at the AND gate 390, an analog gate 397 operates to generate a $+15$ volt pulse, the pulse width corresponding to the duration of the $\bar{A} \cdot B$ condition indicating that the channel B sinusoidal wave 353 leads the channel A sinusoidal wave 351 and it will be appreciated that the opposite is true if the $-15$ volt pulse is generated.

A summing stage 400 is thereafter disposed to receive either the $+15$ volt pulse, the $-15$ volt pulse or a zero voltage. The received voltage quantity is passed through the summing stage 400 into an RC integrator network including a serially connected resistor 402 and a grounded parallelly disposed capacitor 404 to present at an output terminal 406 a direct current voltage level for transmission to the servo amplifier 126 driving the servo motor 128, as illustrated in FIG. 3.

Exemplary of the signal transmitted from the summing stage 400 into the RC integrator network, is a waveform 390 of FIG. 8, illustrating the square wave existent when the condition $A \cdot \bar{B}$ is met thereby providing a $-15$ pulse. After integration of the waveform 390 in the RC integrator network there is provided in the output terminal 406 a direct current voltage level, illustrated by waveform 392 in FIG. 8, proportional to the width of said pulse 390 generated when the condition $A \cdot \bar{B}$ is met.

Obviously, many modifications and variations of the present invention are possible in the light of the above teachings. It is therefore to be understood that within the scope of the appended claims, the invention may be practiced by other than that specifically described and illustrated.

What is claimed is:

1. A system having a given optical axis for locating upon the optical axis a focal point of a scanning beam of light having a cone shaped locus of scan defined from the cone apex disposed at the focal point, the direction of the scan of the beam inverting at the focal point, the system, comprising:
   a photodetector having a photosensitive element substantially disposed on the optical axis and movable along the optical axis for generating output signals as a function of the light beam intensity incident thereon, the relative phase of the output signals being indicative of the direction of the scan of the light beam across the photosensitive element;
   a zero-crossing detector section including two channels each for receiving output signals generated by the photosensitive element, the zero-crossing detector section detecting zero value amplitudes of the output signals and generating therefrom trigger signals having the same phase relationship as the respective output signals from the photosensitive element;
   first means responsive to the phase related trigger output signals received from the zero-crossing detector section for generating a control signal as a function of the axial position of the photosensitive element relative to the focal point; and
   second means responsive to the generated control signal for moving the photosensitive element toward the focal point.

2. The system for locating the focal point of the scanning beam of light according to claim 1, wherein the photosensitive element, comprises:
   two photosensitive surfaces substantially disposed on the optical axis and movable along the optical axis for generating the output signals.

3. The system as defined in claim 2, wherein the photosensitive surfaces face toward the light beam, each surface being disposed adjacent to and generally on opposite sides of the optical axis extending through the cone apex and generally in the direction of the light beam, each of the photosensitive surfaces generating an output signal as a function of the light beam intensity incident thereon, the relative phase of the two output signals being indicative of the direction of scan of the light beam across the photosensitive surfaces.

4. The system as defined in claim 1, wherein the first means responsive to the phase related trigger output signals, comprises:
   a logic network for generating in response to the phase related trigger output signals received from the zero-crossing detector section the control signal, as a function of the axial position of the photodetector relative to the focal point.

5. The system as defined in claim 3, wherein the first means responsive to the phase related trigger output signals, comprises:
   a logic network for generating as a function of the received phase related trigger output signals, a direct current control signal as a function of the axial position of the photosensitive surfaces relative to the focal point.

6. The system as defined in claim 5, wherein the logic network, comprises:
   two bistable switching circuits and a phase detector circuit;
   the bistable switching circuits being coupled between the output of the photodetector and an input of the phase detector circuit, the bistable circuit being switchable from a predetermined first state to a second state by the rigger signals generated in the zero-crossing detector.

7. The system as defined in claim 6, further including,
   reset means for generating a reference signal having a predetermined relationship to the scan of the scanning beam of light, the reset means being coupled to an input of each of the bistable switching circuits whereby the bistable switching circuits may be reset to the first state after each scan of the light beam across the photosensitive surfaces.

8. The system as defined in claim 3, wherein the second means responsive to the generated control signal for moving the photosensitive surfaces toward the focal point, comprises:
- an electro-mechanical negative feedback loop responsive to the control signal for moving the photosensitive surfaces along the optical axis toward the focal point whereby when the photosensitive surfaces are scanned simultaneously, the photosensitive surfaces are disposed at the focal point.

9. The system as defined in claim 8, wherein the electro-mechanical negative feedback loop comprises:
- a servo amplifier coupled to the output from the first means;
- a servo motor coupled to the servo amplifier;
- means coupled to the servo motor for moving the photosensitive surfaces along the optical axis; and
- a tachometer control circuit coupled between the means for moving the photosensitive surfaces and an input to the servo amplifier to close the negative feedback loop to control a slew rate of the photosensitive surfaces along the optical axis.

* * * * *